US012600453B2

(12) United States Patent
Tissot et al.

(10) Patent No.: US 12,600,453 B2
(45) Date of Patent: Apr. 14, 2026

(54) AIR SUPPLY APPARATUS FOR A SHIP, SHIP INCLUDING THE SAME, AND METHOD OF SUPPLYING AIR TO AN AIR LUBRICATION DEVICE

(71) Applicant: ACCELLERON SWITZERLAND LTD., Baden (CH)

(72) Inventors: Jean-Francois Tissot, Bergheim (FR); Jari Keinaenen, Brugg (CH); Daniel Rusch, Wettingen (CH)

(73) Assignee: ACCELLERON SWITZERLAND LTD., Baden (CH)

( * ) Notice: Subject to any disclaimer, the term of this patent is extended or adjusted under 35 U.S.C. 154(b) by 438 days.

(21) Appl. No.: 18/369,072

(22) Filed: Sep. 15, 2023

(65) Prior Publication Data

US 2024/0002027 A1      Jan. 4, 2024

Related U.S. Application Data

(63) Continuation of application No. 18/282,306, filed as application No. PCT/EP2022/057044 on Mar. 17, 2022.

(30) Foreign Application Priority Data

| Mar. 17, 2021 | (EP) | ...................................... | 21163163 |
| Jul. 8, 2021 | (EP) | ...................................... | 21184556 |

(51) Int. Cl.
    B63B 1/38          (2006.01)
    B63H 21/38          (2006.01)
    (Continued)

(52) U.S. Cl.
    CPC ............... B63H 21/38 (2013.01); B63B 1/38 (2013.01); H01M 8/04761 (2013.01); B63B 2001/385 (2013.01); B63H 2021/003 (2013.01)

(58) Field of Classification Search
    CPC ..... B63B 1/38; B63B 2001/385; B63H 21/38; B63H 2021/003; H01M 8/04761
    See application file for complete search history.

(56) References Cited

U.S. PATENT DOCUMENTS

| 3,342,032 A | * | 9/1967 | Cox | ....................... | B63H 11/00 |
| | | | | | 114/62 |
| 4,643,685 A | * | 2/1987 | Nishida | .................. | B63H 21/32 |
| | | | | | 60/221 |

(Continued)

FOREIGN PATENT DOCUMENTS

| DE | 102019105843 A1 | 4/2019 |
| JP | 2001233282 A | 8/2001 |

(Continued)

OTHER PUBLICATIONS

Ahn Junkeon et al: "Performance and availability of a marine generator-solid oxide fuel cell-gas turbine hybrid system in a very large ethane carrier", Journal of Power Sources, Elsevier, Amsterdam, NL, vol. 399, Jul. 30, 2018 (Jul. 30, 2018), pp. 199-206, XP085461346, ISSN: 0378-7753, DOI: 10.1016/J.JPOWSOUR. 2018.07.103.

(Continued)

*Primary Examiner* — Tye William Abell
(74) *Attorney, Agent, or Firm* — Meunier Carlin & Curfman LLC

(57)          ABSTRACT

An air supply apparatus for a ship is described. The air supply apparatus includes a fuel cell and an air lubrication device for resistance reduction of the ship. An exhaust gas outlet of the fuel cell is connected with the air lubrication device via an exhaust gas line for supplying exhaust gas to the air lubrication device. Further, a ship comprising an air supply apparatus according to any embodiments described herein as well as a method of supplying air to an air lubrication device of a ship are described.

17 Claims, 6 Drawing Sheets

(51) Int. Cl.
　　*H01M 8/04746*　　(2016.01)
　　*B63H 21/00*　　(2006.01)

(56) References Cited

U.S. PATENT DOCUMENTS

| | | | | |
|---|---|---|---|---|
| 2002/0142208 A1* | 10/2002 | Keefer | .............. | H01M 8/04007 |
| | | | | 429/411 |
| 2005/0215129 A1* | 9/2005 | Abdel-Maksoud | .... | B63H 11/08 |
| | | | | 440/38 |
| 2022/0142208 A1 | 5/2022 | Johnson | | |
| 2024/0043095 A1* | 2/2024 | Goetz | ................... | B63H 21/17 |

FOREIGN PATENT DOCUMENTS

| | | | |
|---|---|---|---|
| JP | 200466917 | A | 4/2004 |
| JP | 2012530010 | A | 11/2012 |
| JP | 2013216322 | A | 10/2013 |
| KR | 20180075296 | A | 7/2018 |
| WO | 2020192932 | A1 | 10/2020 |
| WO | 2022175360 | A1 | 8/2022 |

OTHER PUBLICATIONS

Communication pursuant to Article 94(3) EPC in connection to EP Application No. 22716054.6, dated Oct. 10, 2025.
International Search Report and Written Opinion in Application No. PCT/EP2022/057044, mailed Jul. 7, 2022, 17 pages.
Extended European Search Report in Application No. 21163163.5, dated Sep. 24, 2021, 8 pages.
Extended European Search Report in Application No. 21184556.5, dated Jan. 5, 2022, 8 pages.
Ahn Junkeon et al: "Performance and availability of a marine generator-solid oxide fuel cell-gas turbine hybrid system in a very large ethane carrier", Journal of Power Sources, Elsevier, Amsterdam, NL, vol. 399, Jul. 30, 2018 (Jul. 30, 2018), pp. 199-206.
Non-Final Office Action in connection to U.S. Appl. No. 18/282,306, dated Nov. 25, 2025.

* cited by examiner

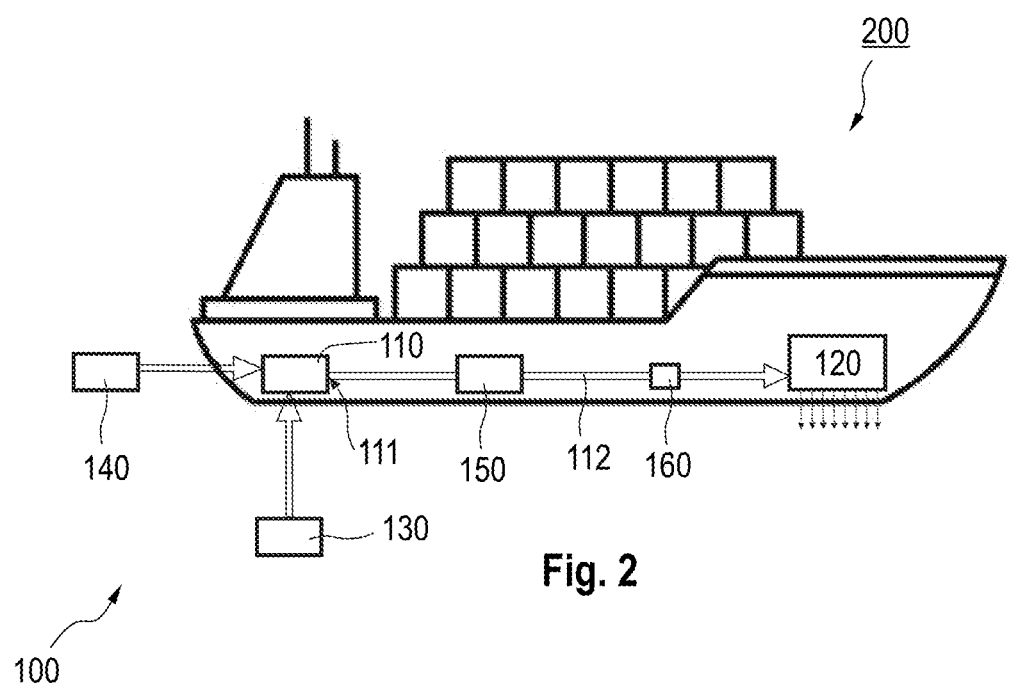
Fig. 2
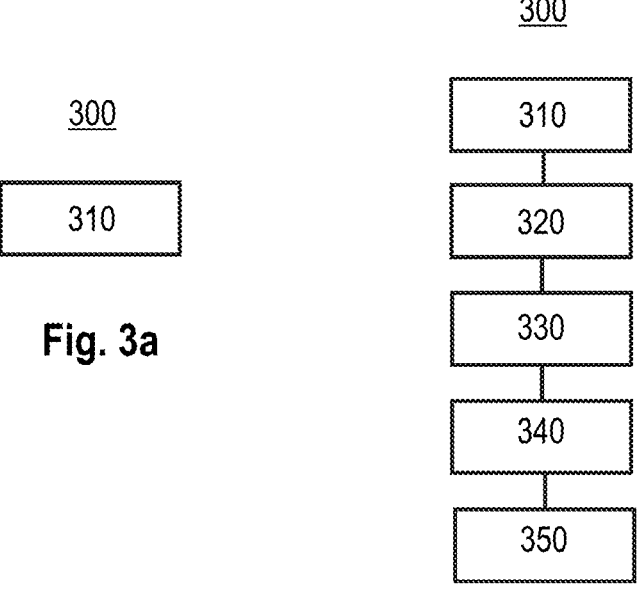
300
310
Fig. 3a
300
310
320
330
340
350
Fig. 3b

AIR SUPPLY APPARATUS FOR A SHIP, SHIP INCLUDING THE SAME, AND METHOD OF SUPPLYING AIR TO AN AIR LUBRICATION DEVICE

CROSS-REFERENCE TO RELATED APPLICATION

This application is a continuation application of U.S. application Ser. No. 18/282,306 filed Sep. 15, 2023, which is a national phase application filed under 35 USC 371 of PCT application PCT/EP2022/057044 that claims priority to EP 21163163.5 filed Mar. 17, 2021 and EP 21184556.5 filed Jul. 8, 2021.

TECHNICAL FIELD

Embodiments of the present disclosure relate to an air supply apparatus of an air lubrication type ship for reducing water friction resistance. Further, embodiments of the present disclosure relate to a method of supplying air to an air lubrication device of a ship. Further, embodiments of the present disclosure relate to a method of installing a fuel cell in an air supply apparatus.

BACKGROUND

Generally, a ship receives friction resistance of water during marine navigation on its submerged surface of the ship's bottom. Especially for large ships, e.g. cargo ships, a large portion of the ship's hull resistance of results from friction resistance generated by relative flow of outside water at the ship's bottom.

To reduce ship's hull friction resistance air lubrication can be used, particularly by discharging air into surroundings of the ship's hull. The reduction of friction resistance has a large fuel economy improving effect, and thus represents effective means to reduce the $CO_2$ emission of the ship.

In the state of the art, there are various systems and approaches for the production of air bubbles for the hull lubrication. For instance, for the generation of air bubbles for hull lubrication, the prior art teaches usage of separate or dedicated mechanical electrical compressors or blowers.

However, there is a continuous demand for improved methods and systems for hull lubrication, particularly with respect to energy consumption and eco friendliness.

SUMMARY

In light of the above, an air supply apparatus for a ship, a ship including the air supply apparatus, a method of supplying air to an air lubrication device of a ship, and a method of installing a fuel cell in an air supply apparatus according to the independent claims are provided. Further aspects, advantages, and features are apparent from the dependent claims, the description, and the accompanying drawings.

According to an aspect of the present disclosure, an air supply apparatus for a ship is provided. The air supply apparatus includes a fuel cell and an air lubrication device for resistance reduction of the ship. An exhaust gas outlet of the fuel cell is connected with the air lubrication device via an exhaust gas line for supplying exhaust gas to the air lubrication device.

Accordingly, compared to conventional apparatuses used for air lubrication type ships, the air supply apparatus of the present disclosure is improved with respect to energy consumption and eco friendliness.

According to a further aspect of the present disclosure, a ship including an air supply apparatus according to any embodiments described herein is provided.

According to another aspect of the present disclosure, a method of supplying air to an air lubrication device of a ship is provided. The method includes supplying exhaust gas from a fuel cell to the air lubrication device.

According to an aspect of the present disclosure, an air supply apparatus for a ship is provided. The air supply apparatus includes a fuel cell, an air lubrication device for resistance reduction of the ship, and a compressor connected to a pressurised line system for providing pressurised fluid to the pressurised line system. The pressurised line system is connected to the fuel cell for providing the fuel cell with pressurised fluid from the compressor. The pressurised line system is further connected to the air lubrication device for providing pressurised fluid to the air lubrication device.

Accordingly, compared to conventional apparatuses used for air lubrication type ships, the air supply apparatus of the present disclosure is improved with respect to energy consumption and eco friendliness.

According to a further aspect of the present disclosure, a ship including an air supply apparatus according to any embodiments described herein is provided.

According to another aspect of the present disclosure, a method of installing a fuel cell in an air supply apparatus for a ship is provided. The air supply apparatus includes an air lubrication device for resistance reduction of the ship, and a compressor for providing the air lubrication device with pressurised fluid. The method includes connecting the compressor outlet and an inlet of the fuel cell via an intake gas line or a bifurcated intake gas line. The method further includes connecting an inlet of the air lubrication device with an exhaust gas outlet of the fuel cell via an exhaust gas line or connecting an inlet of the air lubrication device with the compressor outlet via the bifurcated intake gas line.

Those skilled in the art will recognise additional features and advantages upon reading the following detailed description, and upon viewing the accompanying drawings.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following:

FIG. 2 shows a schematic view a ship with an air supply apparatus according to further embodiments described herein; and FIGS. 3a and 3b show block diagrams for illustrating embodiments of a method of supplying air to an air lubrication device of a ship according to embodiments described herein.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
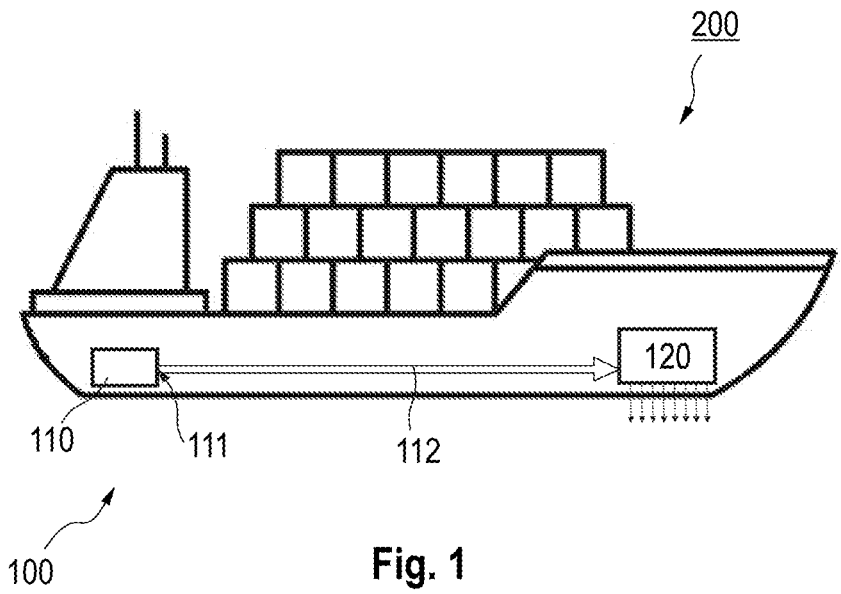
FIG. 1 shows a schematic view of a ship with an air supply apparatus according to embodiments described herein.

With exemplary reference to FIG. 1, an air supply apparatus 100 for a ship 200 according to the present disclosure is described. According to embodiments, which can be combined with other embodiments described herein, the air supply apparatus 100 includes a fuel cell 110 and an air lubrication device 120 for resistance reduction of the ship 200. In particular, the air lubrication device 120 is configured for air bubble generation for hull lubrication. More specifically, typically the air lubrication device is configured for generating or forming an air layer on a bottom surface of the hull by discharging air to an outer surface below a waterline of the hull. In other words, to reduce ship's hull friction resistance air lubrication can be used, particularly by discharging air into surroundings of the ship's hull, especially under the hull. Accordingly, beneficially frictional resistance between the ship and water can be reduced. As exemplarily indicated in FIG. 1, an exhaust gas outlet 111 of the fuel cell 110 is connected with the air lubrication device 120 via an exhaust gas line 112 for supplying exhaust gas to the air lubrication device 120.

Accordingly, embodiments of the air supply apparatus as described herein, beneficially provide for improved energy efficiency and eco friendliness compared to conventional apparatuses used for air lubrication type ships.

With exemplary reference to FIG. 2, according to embodiments, which can be combined with other embodiments described herein, the fuel cell 110 is connected to a compressor 130 for providing the fuel cell 110 with pressurized air. In other words, the fuel cell 110 can be a pressurized fuel cell which can be beneficial for supplying the air lubrication device with a pressurized flow. Accordingly, the energy efficiency of the ship may be improved. Further, the global carbon footprint of the ship can be reduced.

According to embodiments, which can be combined with other embodiments described herein, the fuel cell 110 is connected to a fuel supply 140, as exemplarily shown in FIG. 2. The fuel supply 140 is configured for providing the fuel cell 110 with fuel. In particular, the fuel can be at least one of hydrogen, methane, methanol, ammonia or any other suitable fuel. Accordingly, compared to conventional fuels used in marine transportation such as heavy oil, eco friendliness can be improved.

With exemplary reference to FIG. 2, according to embodiments, which can be combined with other embodiments described herein, the air supply apparatus 100 further includes at least one component 150 selected from an after burner, an oxidizer, a turbine, an expander, a heat exchanger, a throttle, particularly a flap, and a recirculation device. As exemplarily shown in FIG. 2, typically the at least one component 150 is connected to the exhaust gas line 112. Providing one or more of the further components 150 as described herein may be beneficial for improving the performance of the air supply apparatus, particularly the global system. It is to be understood that each of the at least one component 150 can be arranged in series or parallel.

According to embodiments, which can be combined with other embodiments described herein, the air supply apparatus 100 further includes a flow control device 160 connected to the exhaust gas line 112. In particular, the flow control device can be a valve or a flap. For instance, the flow control device 160 may be provided in series to the at least one component 150, particularly downstream of the at least one component 150. Alternatively, the flow control device 160 can be provided in parallel to the at least one component 150. Accordingly, beneficially the air supply rate to the air lubrication device 120 can be adjusted.

According to embodiments, which can be combined with other embodiments described herein, the fuel cell 110 is a proton exchange membrane fuel cell (PEMFC) or a solid oxide fuel cell (SOFC) or any other fuel cell type, particularly any other fuel cell for mobile applications.

Accordingly, from FIGS. 1 and 2 it is to be understood, that according to another aspect of the present disclosure a ship 200 including an air supply apparatus according to any embodiments described herein is provided. Thus, a ship with a more efficient end more ecofriendly system for water-hull friction reduction can be provided, which can reduce the overall operation costs. In the present disclosure, the term "ship" may also include a boat or any other watercraft.

With exemplary reference to the block diagrams shown in FIGS. 3*a* and 3*b*, embodiments of a method 300 of supplying air to an air lubrication device 120 of a ship 200 according to the present disclosure are described. According to embodiments, which can be combined with other embodiments described herein, the method includes supplying (represented by block 310 in FIG. 3*a*) exhaust gas from a fuel cell 110 to the air lubrication device 120. Typically, the exhaust gas from the fuel cell is $O_2$-poor air and/or steam. In particular, supplying the exhaust gas from the fuel cell to the air lubrication device typically includes directly routing the exhaust gas to the air lubrication device, particularly without using the exhaust gas rest energy to propel a turbocharger.

With exemplary reference to FIG. 3*b*, according to embodiments, which can be combined with other embodiments described herein, the method 300 further includes providing (represented by block 320 in FIG. 3*b*) the fuel cell 110 with pressurized air.

According to embodiments, which can be combined with other embodiments described herein, the method 300 further includes guiding (represented by block 330 in FIG. 3*b*) the exhaust gas through at least one component 150 selected from an after burner, an oxidizer, a turbine, an expander, a heat exchanger, a throttle, particularly a flap, and a recirculation device, prior to ejecting the exhaust gas from the air lubrication device 120.

According to embodiments, which can be combined with other embodiments described herein, the method 300 further includes controlling (represented by block 340 in FIG. 3*b*) the exhaust gas flow provided to the air lubrication device 120 by using a flow control device 160. In particular, the flow control device 160 is a valve or a flap.

It is to be understood that typically the method 300 of supplying air to an air lubrication device 120 of a ship 200 includes using (represented by block 350 in FIG. 3*b*) the air supply apparatus 100 according to any embodiments described herein. In other words, the method 300 of supplying air to an air lubrication device 120 of a ship 200 can be carried out by employing the supply apparatus 100 according to any embodiments described herein. Further, it is to be understood that the specific combination of method blocks 310, 320, 330, 340 and 350 is only an example. In other words, the method blocks 320, 330, 340 and 350 represent optional additional method features which can be arbitrarily combined with the main block 310 of the method 300. More specifically, supplying (represented by block 310 in FIGS. 3*a* and 3*b*) exhaust gas from a fuel cell 110 to the air lubrication device 120 can be combined with one or more of the method blocks 320, 330, 340 and 350 as exemplarily described herein.

Hence, in view of the above, it is to be understood that compared to the state of the art, the embodiments described herein beneficially provide for improved energy efficiency and eco friendliness, such that $CO_2$ emission and operation costs can be reduced. Further, it is pointed that in contrast to the prior art, according to embodiments, which can be combined with other embodiments described herein, the air supply apparatus is configured to send energy and exhaust fluid from the fuel cell to the air lubrication device. In particular, embodiments of the present disclosure can be configured for directly providing the exhaust gas (e.g. $O_2$-poor air and steam) from the fuel cell to the hull lubrication input. In other words, according to embodiments, which can be combined with other embodiments described herein, the exhaust gas outlet of the fuel cell is directly connected with the air lubrication device via the exhaust gas line, such that the exhaust gas from the fuel cell is directly routed to the air lubrication device.

Figure 4:
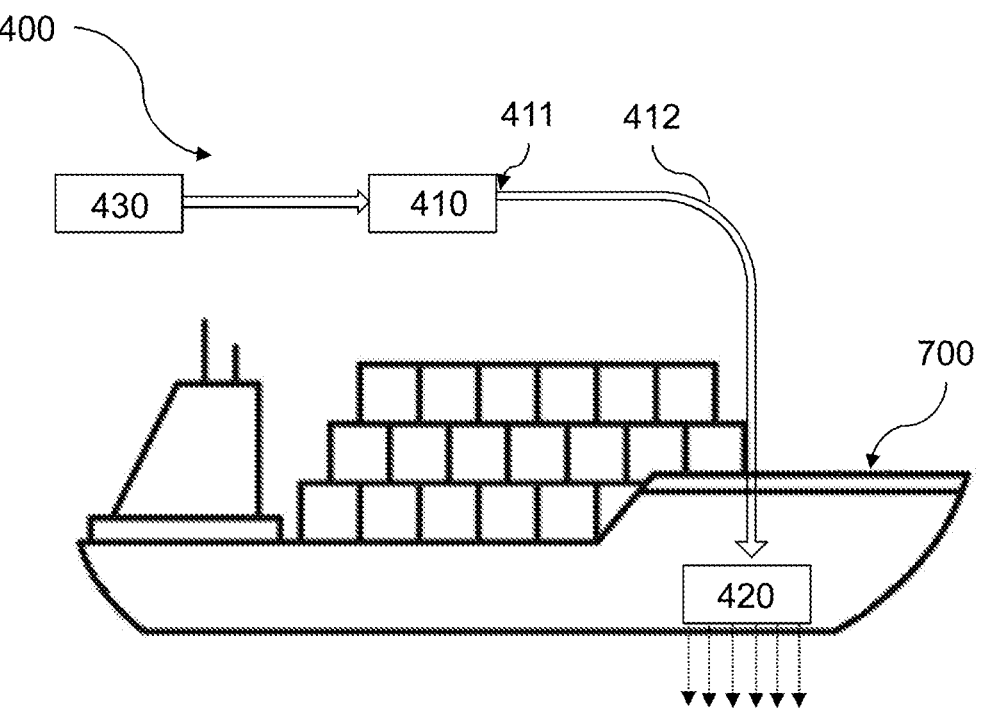
FIG. 4 shows a schematic view of a ship with an air supply apparatus according to embodiments described herein.

With exemplary reference to FIG. 4, an air supply apparatus 400 for a ship 700 according to an aspect of the present disclosure is described. According to embodiments, which can be combined with other embodiments described herein, the air supply apparatus 400 includes a fuel cell 410 and an air lubrication device 420 for resistance reduction of the ship 700.

In particular, the air lubrication device 420 is configured for air bubble generation for hull lubrication. Typically, the air lubrication device is configured for generating or forming an air layer on a bottom surface of the hull by discharging air to an outer surface below a waterline of the hull. In other words, lubrication can be used to reduce the ship's hull friction resistance air, particularly by discharging air into surroundings of the ship's hull, especially under the hull. Beneficially, frictional resistance between the ship and water can be reduced. Hull drag commonly represents the main fraction of the ship fuel consumption. Illustratively, injecting air bubbles under the hull may improve the consumption of a ship by up to about 10%. The fuel consumption by means of injecting air bubbles can be improved for essentially all types of ships regardless of the mode of propulsion (Diesel, gas, electric with battery, fuel cell, hybrid).

Although the term "air" lubrication device 420 is used throughout this application, the "air" lubrication device 420 is not limited to applications with air. For example, and as discussed further below, the exhaust gas originating from the fuel cell 410 may be introduced (optionally in a further pressurised manner) into the air lubrication device 420. In this case, the exhaust gas may simply correspond to air, it may, however, also correspond to (highly) humid air, or may contain further gases or particles (the particles are in such a case typically not environmentally harmful). Thus, although air is preferably used, the "air" lubrication device 420 may be fully operational with any type of pressurised fluid, and is not limited to being operated with air.

For the purpose of generating gaseous bubbles, the air supply apparatus 400 includes a compressor 430. The compressor 430 is connected to a pressurised line system for providing pressurised fluid to the pressurised line system. The pressurised line system may correspond to a manifold of several individual gas lines or line sections, such as, but not limited to one or more of an exhaust gas line 412, 512, an intake gas line 414, a bifurcated intake gas line 514, a first branch-off intake line 515, and a second branch-off intake line 516.

In the exemplary embodiment shown in FIG. 4, the pressurised line system includes an exhaust gas line 412 and an intake gas line fluidly connecting the compressor and the fuel cell 410 (not labelled with a reference numeral).

The pressurised line system 412, 414, 512, 514, 515, 516 is further connected to the fuel cell 410 for providing the fuel cell 410 with pressurised fluid from the compressor 430. In other words, the fuel cell 410 is a pressurised fuel cell which can (in some embodiments) be beneficial for supplying the air lubrication device with a pressurised flow. Accordingly, the energy efficiency of the ship may be improved. Further, the global carbon footprint of the ship can be reduced. Pressurization of the fuel cell is advantageous for fuel cell efficiency and power density improvements.

The pressurised fluid provided to the fuel cell 410 is typically compressed air. In an embodiment, a compressor outlet and an inlet of the fuel cell 410 may be directly connected by the intake gas line, as illustrated in FIG. 4. In other embodiments, further components may be arranged in the gas line connecting compressor and fuel cell 410, as described further below.

The pressurised line system 412, 414, 512, 514, 515, 516 is further connected to the air lubrication device 420 for providing pressurised fluid to the air lubrication device 420. The pressurised fluid conveyed to the air lubrication device 420 may, for example, be pressurised air, or exhaust gas, such as humid air, of the fuel cell.

Embodiments of the present disclosure allow for providing both a fuel cell as well as an air lubrication device with a pressurised fluid while only requiring one compressor or compressor system for this purpose. The air supply apparatus of the present disclosure is less complex and simpler to implement compared to prior art systems. Moreover, the present air supply apparatus reduces the air compression work and thus energy consumption required for pressurising both the fuel cell and the air lubrication device. In case of a compressor and an air lubrication device already being present on a ship, the air supply apparatus can be retrofit to the already existing system, as also discussed further below. In such a case, energetically speaking, the fuel cell is thus pressurised "for free". The fuel cell may be provided on the ship for various purposes, e.g. the fuel cell may be used for ship propulsion, but also for other purposes, such as powering other electrical devices on the ship. The air supply apparatus of the present disclosure may be put into practice regardless of the purpose for installing the fuel cell on the ship. The air supply apparatus of the present disclosure can allow for shutting down the air lubrication system in certain circumstances (such as in case the ship is not moving) while keeping the fuel cell(s) in operation with pressurised fluid and while preferably recovering at least some of the energy of the pressurised fluid (as described further below).

According to an embodiment, an exhaust gas outlet 411 of the fuel cell 410 is connected with the air lubrication device 420 via an exhaust gas line 412 of the pressurised line system for supplying exhaust gas to the air lubrication device 420. FIGS. 4, 5*a*, 5*b* and 6 illustrate examples of such embodiments. By supplying exhaust gas of the fuel cell to the air lubrication device, the addition of an expander or turbine downstream of the fuel cell for recovering a fraction of the pressure enthalpy is not necessarily required, as the pressurised fluid is further used for the air lubrication device. Further usage of the pressurised fluid for the air lubrication device results in less efficiency losses, as thermodynamic transformation (between different forms of energy) is reduced, and the mechanical complexity of the air supply apparatus is reduced.

Figure 7:
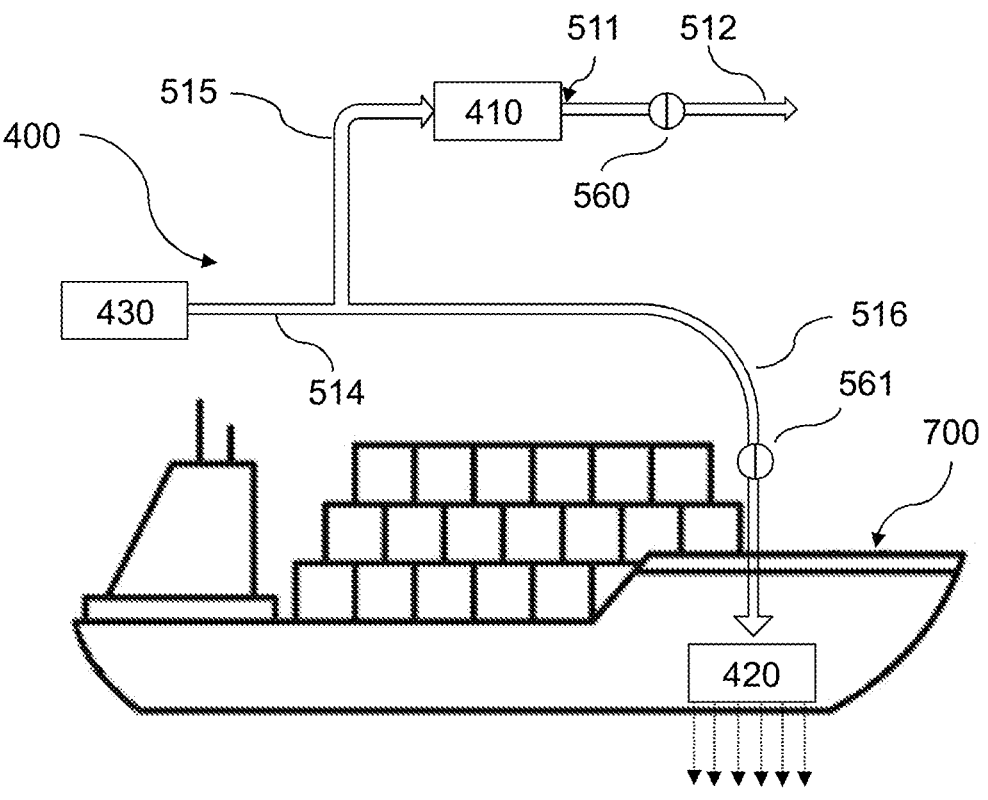
FIG. 7 shows a schematic view of a ship with an air supply apparatus according to further embodiments described herein.

According to another embodiment, a compressor outlet of the compressor 430 is connected with the air lubrication device 420 via a bifurcated intake gas line 514 of the pressurised line system for supplying pressurised fluid from the compressor outlet to the air lubrication device 420. In this embodiment, the pressurised fluid may typically be pressurised air. An exemplary embodiment thereof is illustrated, for example, in FIG. 7. According to a preferred embodiment, a bifurcation corresponds to at least two branch-off lines which do not unite or merge further downstream of the bifurcation. In this embodiment, the pressurised fluid or exhaust gas originating from the fuel cell 410 may preferably not be conveyed to the air lubrication device 420. Instead, the pressurised fluid or exhaust gas originating from the fuel cell 410 may be used for other purposes, such as recovering a fraction of the pressure enthalpy.

Figure 8:
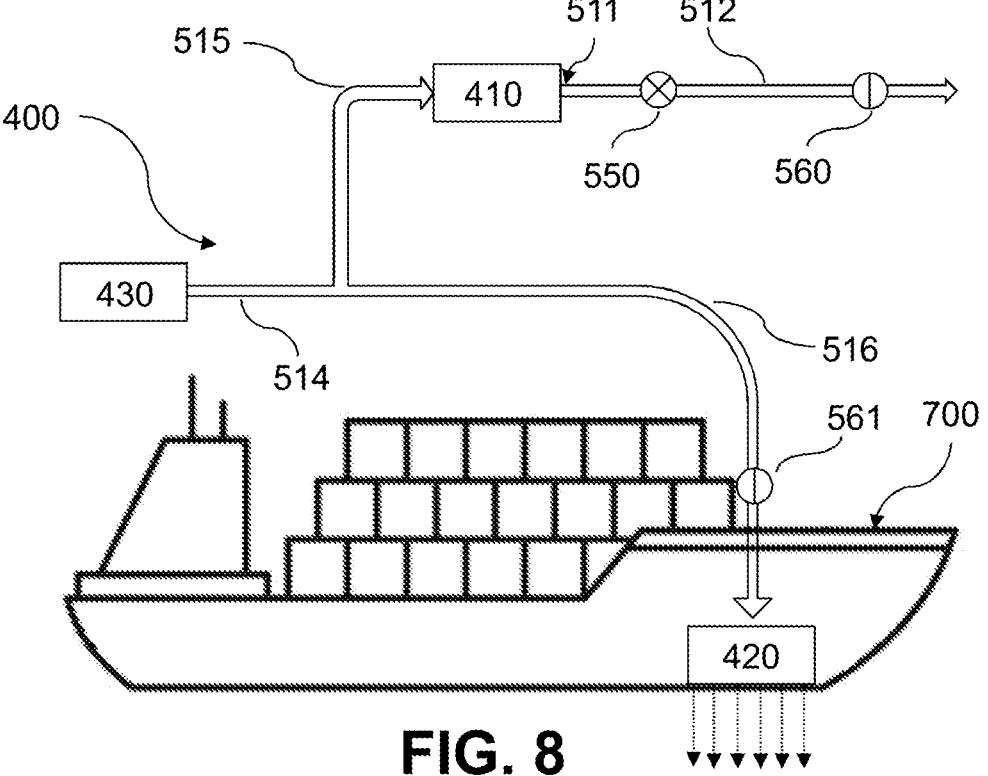
FIG. 8 shows a schematic view of a ship with an air supply apparatus according to further embodiments described herein.
Figure 9:
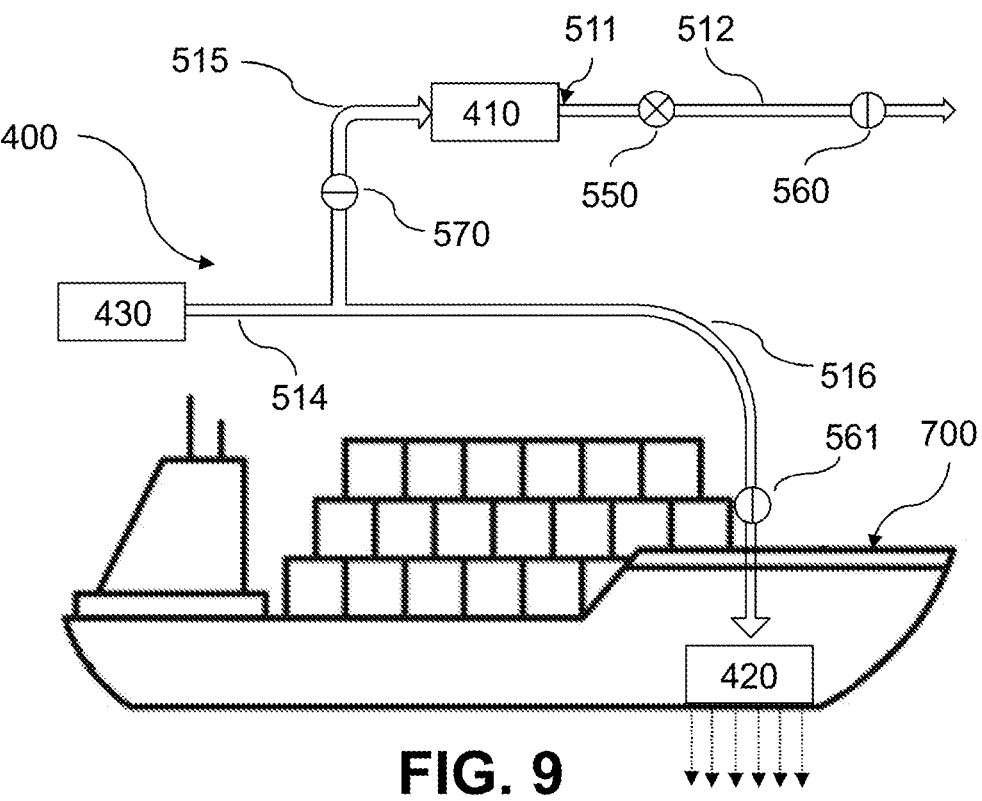
FIG. 9 shows a schematic view of a ship with an air supply apparatus according to further embodiments described herein.
Figure 10:
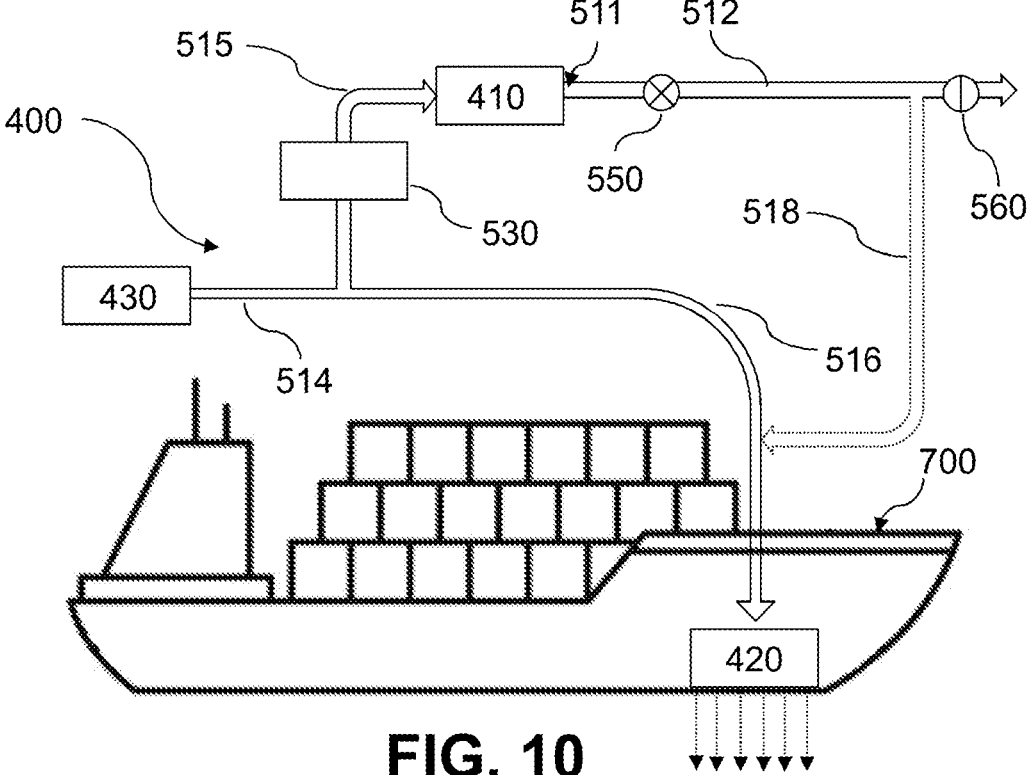
FIG. 10 shows a schematic view of a ship with an air supply apparatus according to further embodiments described herein.

The bifurcated intake gas line 514 may include a first branch-off intake line 515 connected to the fuel cell 410 and a second branch-off intake line 516 connected to the air lubrication device 420. FIGS. 8 to 10 show examples of the first and second branch-off intake lines 515, 516.

Figure 5A:
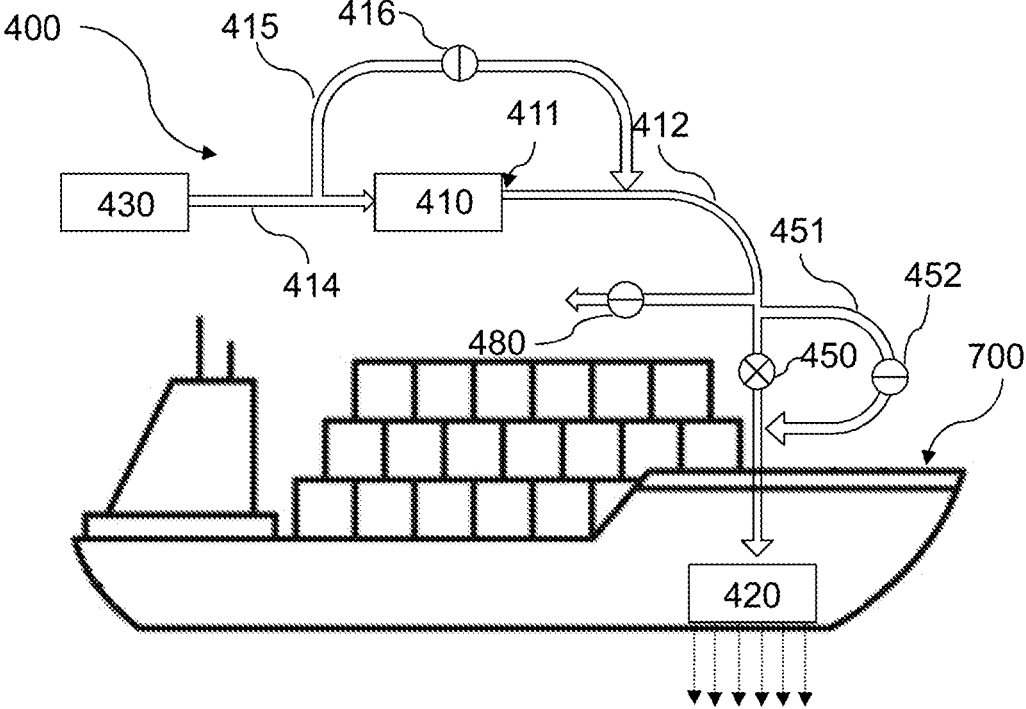
FIG. 5a shows a schematic view of a ship with an air supply apparatus according to further embodiments described herein.
Figure 6:
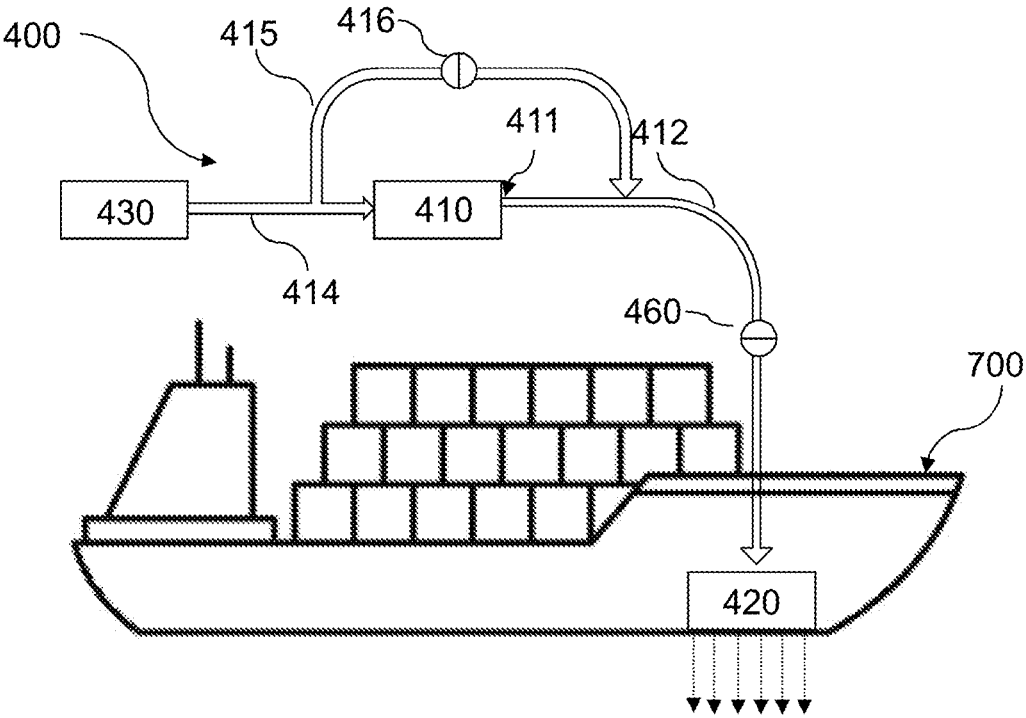
FIG. 6 shows a schematic view of a ship with an air supply apparatus according to further embodiments described herein.

According to embodiments, which can be combined with other embodiments described herein, the air supply apparatus 400 further includes a fuel cell bypass 415 connected to the pressurised line system, in particular the bifurcated intake gas line 514 or an intake gas line 414 and the exhaust gas line 412. FIG. 5*a* illustrates an exemplary embodiment including a fuel cell bypass 415 connected to an intake gas line 414. With further reference to FIGS. 5*a* and 6, the air supply apparatus may include a fuel cell bypass flow control device 416 configured for independently controlling a flow of the pressurised fluid to the fuel cell 410. The fuel cell bypass flow control device 416 may optionally be further configured for controlling a flow of the pressurised fluid to the air lubrication device 420. The fuel cell bypass flow control device 416 may preferably be a valve, or a flap. The fuel cell bypass flow control device 416 allows for setting the pressure as desired for a specific operation mode.

Figure 5B:
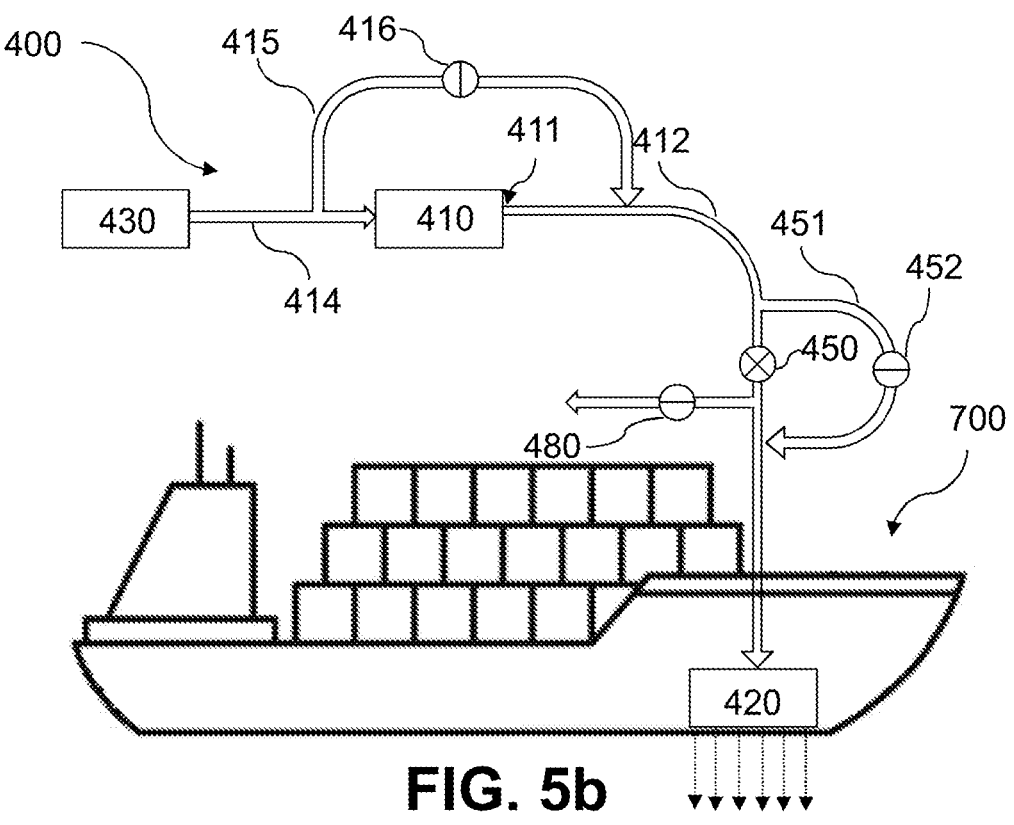
FIG. 5*b* shows a schematic view of a ship with an air supply apparatus according to further embodiments described herein.

In one embodiment, the air supply apparatus may further include a blow-off valve 480 for releasing pressurised fluid. Examples of a blow-off valve 480 are illustrated in FIGS. 5*a* and 5*b*. The blow-off valve 480 allows for releasing substantial portions of the pressurised fluid or even the entire overpressure to the atmosphere in case it is not desired to pressurise one or more of the components of the air supply apparatus. Illustratively, the blow-off valve 480 may be connected to the exhaust gas line 412, 512. For example, in case pressurising of the fuel cell is required for a certain application, but pressurising of the air lubrication device is undesired (e.g. in case the ship is not moving), the pressurised fluid may be released before being injecting into the air lubrication device 420. The blow-off valve 480 may be arranged downstream of the fuel cell 410 and/or upstream of the air lubrication device 420. The air supply apparatus may further include a blow-off outflow line connected the exhaust gas line 412, 512. The blow-off valve 480 may be arranged in the blow-off outflow line.

In one exemplary embodiment, the blow-off valve 480 and/or the blow-off outflow line may be arranged upstream of a turbine 450 (described in more detail further below) and/or upstream of a turbine bypass 451 (described in more detail further below). An example of a blow-off valve 480 being arranged upstream of the turbine 450 is illustrated in FIG. 5*a*.

In another exemplary embodiment, the blow-off valve 480 and/or the blow-off outflow line may be arranged downstream of the turbine 450 (described in more detail further below) and/or upstream of the turbine bypass 451 (described in more detail further below) merging or uniting with the exhaust gas line 412, 512. An example of a blow-off valve 480 being arranged downstream of the turbine 450 is illustrated in FIG. 5*b*. This allow for recovering back pressure energy/enthalpy in case the fuel cell is pressurised, and the air lubrication device is not in use (e.g. if the ship is not moving or to avoid any potential damage in case the ship is in a port or a shallow seabed).

According to embodiments, which can be combined with other embodiments described herein, the air supply apparatus 400 further includes a flow control device 460, 560, 561. The flow control device 460, 560, 561 is preferably a valve or a flap. For example, the flow control device 460, 560, 561 may be a throttle valve. Each of FIGS. 6 to 10 illustrate examples of the flow control device 460, 560, 561. The flow control device 460, 560, 561 is preferably arranged downstream of the fuel cell 410 and/or upstream of the air lubrication device 120. The flow control device 460, 560, 561 is preferably arranged downstream of the fuel cell bypass 415 merging or uniting with the exhaust gas line 412, 512. Preferably, the flow control device 460, 560, 561 is connected to the exhaust gas line 412, 512 and/or the second branch-off intake line 516. The flow control device 460, 560, 561 may allow for adjusting the flow in the first and second branch-off intake lines 515, 516, and thus the flow of pressurised fluid injected respectively to the fuel cell 410 and the air lubrication device 420. The flow control device 460, 560, 561 being connected to the exhaust gas line 412, 512 (as illustrated for example in FIG. 6) allows for the possibility of controlling the charging pressure of the fuel cell 410 independently from the air lubrication device pressure. The pressure required for the air lubrication device is typically determined by the draft depth of the ship.

In one embodiment, the air supply apparatus 400 further includes a turbine 450, 550 connected to the exhaust gas line 412, 512. The turbine is illustrated in FIGS. 5*a* and 8-10. The turbine is arranged downstream of the fuel cell 410 and/or upstream of the air lubrication device 420. The turbine is preferably arranged upstream of the flow control device 460, 560, 561 (if present). The turbine 450, 550 is preferably arranged downstream of the fuel cell bypass 415 merging or uniting with the exhaust gas line 412, 512. The turbine 450, 550 allows for recovering a fraction of the energy of the exhaust gas originating from the fuel cell 410. For example, in case the exhaust gas is released to the atmosphere, the turbine 450, 550 allows for recovering a fraction of the energy. In case the exhaust gas is conveyed to the air lubrication device 420, the air supply apparatus 400 may also include the turbine 450, 550. The air lubrication device typically has lower pressure requirements compared to the fuel cell 410. Therefore, a fraction of the energy may be recovered by the turbine 450, 550, while still ensuring a pressure high enough for operating the air lubrication device 420. Moreover, the turbine allows for adjusting the charging pressures of fuel cell and air lubrication device independently, for example depending on the requirements due to the speed of the ship, the fuel cell load, or conditions of navigation. The turbine 450, 550 is preferably provided in series to the flow control device 460, 560, 561 and/or in parallel with the blow-off valve 480 and the blow-off outflow line.

In case the air supply apparatus 400 includes a turbine 450, 550, the air supply apparatus 400 may further comprise a turbine bypass 451 and a turbine bypass valve 452. The turbine bypass 451 is illustrated in FIG. 5a. The turbine bypass may be connected to the exhaust gas line 412. The turbine bypass 451 and/or the turbine bypass valve 452 allow for limiting the pressure reduction resulting from recovering energy by the turbine.

The turbine 450 may be a fixed geometry turbine and optionally include a turbine bypass 451 and a turbine bypass valve 452. Alternatively, the turbine 450 may be a variable geometry turbine 450 and optionally include a turbine bypass 451 and a turbine bypass valve 452.

According to embodiments, which can be combined with other embodiments described herein, the air supply apparatus 400 further includes a high-pressure compressor 530 arranged downstream of the compressor 430 and upstream of the fuel cell 410 for providing the fuel cell 410 with pressurised fluid. An example of a high-pressure compressor is illustrated in FIG. 10. Typically, the high-pressure compressor 530 is arranged in the first branch-off intake line 515. In many applications, the fuel cell requires higher pressures compared to the air lubrication system, or even higher pressures than the maximal pressure offered by a one-stage compression process. The compressor 430 in connection with the high-pressure compressor 530 may be regarded as a two-stage compressor. In this embodiment, the compressor 430 may also be referred to as low-pressure compressor. The two-stage compressor ensures that the charging pressure is sufficiently high for the fuel cell 410.

The air supply apparatus 400 may further include an intercooler arranged between the (low-pressure) compressor 430 and the high-pressure compressor 530. Stated differently, an intercooler may be arranged in the first branch-off intake line 515 upstream of the high-pressure compressor 530. Beneficially, the intercooler improves the compression efficiency.

In one exemplary embodiment, the air supply apparatus 400 may include the high-pressure compressor 530 according to any embodiment described herein, and the turbine 450, 550 according to any embodiment described herein. FIG. 10 illustrates an exemplary embodiment including the high-pressure compressor 530 and the turbine 550. For example, the high-pressure compressor 530 may provide pressurised fluid to the fuel cell with a pressure of 4 bar or more, whereas the exhaust gas originating from the fuel cell may be released to the atmosphere, or is provided to the air lubrication device, which may typically only require pressurised fluids having a pressure of 1.5 or 2 bar, for example. Combining the high-pressure compressor 530 with the turbine 450, 550 is particularly advantageous for recovering energy from the high-pressure fluid generated by the high-pressure compressor 530.

In one embodiment, the high-pressure compressor 530 is configured for supplying the pressurised fluid to the air lubrication device 420 via the fuel cell 410. In one embodiment, the exhaust gas line 512 of the fuel cell 410 is connected with the bifurcated intake gas line 514, and in particular the second branch-off intake line 516. This connection line 518 is sketched by the dotted lines on the right-hand side of FIG. 10. The air supply apparatus 400 may further include at least one of a valve, a flap and a further turbine arranged within the connection line 518 (not shown in FIG. 10). Additionally or alternatively, the second branch-off intake line 516 may further include the flow control device 460, 560, 561 and/or the turbine 450, 550 upstream of the air lubrication device 420 (not shown in FIG. 10).

The air supply apparatus 400 may include an inflow control device 570. For example, an inflow control device is illustrated in FIG. 9. The inflow control device 570 may be arranged downstream of the compressor 430 and upstream of the fuel cell 410. The inflow control device 570 is preferably arranged in series with the fuel cell 410 and/or arranged in the first branch-off intake line 515 or in the intake gas line 414. The inflow control device 570 is preferably arranged upstream of the fuel cell bypass 415. The inflow control device 570 may be configured for controlling a charging pressure of the fuel cell 410. In a preferred embodiment, the inflow control device 570 is at least one of a valve, a flap and a second turbine.

The air supply apparatus 400 may include a second turbine bypass and/or a second turbine bypass valve in embodiments, in which the inflow control device 570 is a second turbine. The second turbine bypass is configured for bypassing the second turbine. It is noted that the air supply apparatus 400 may include the second turbine and/or the second turbine bypass and/or the second turbine bypass valve without including the (first) turbine and/or the (first) turbine bypass and/or the (first) turbine bypass valve. The turbines differ in that the (first) turbine is preferably connected to the exhaust gas line 412, 512, whereas the second turbine 570 is preferably arranged upstream of the fuel cell 410.

In the following, some preferred embodiments of the invention will be summarised:

1) The air supply apparatus 400 according to any embodiment disclosed herein, including the compressor 430, the fuel cell 410, the air lubrication device 420, the turbine 450, 550, and the flow control device 460, 560, 561. The turbine 450, 550, and the flow control device 460, 560, 561 are connected to the exhaust gas line 412, 512. The flow control device 560, 560, 561 is preferably a valve. The flow control device 460, 560, 561 is arranged downstream of the turbine 450, 550. The exhaust gas line 412, 512 may optionally be a bifurcated exhaust gas line having a first branch-off exhaust gas line and a second branch-off exhaust gas line. The turbine 450, 550, the flow control device 460, 560, 561, and the air lubrication device 420 may be arranged in series in the first branch-off exhaust gas line. The second branch-off exhaust gas line may include a third turbine and a further flow control device. The second branch-off exhaust gas line, and in particular the further flow control device, may be configured for directly releasing the pressurised fluid to the atmosphere. The further flow control device is preferably arranged downstream of the third turbine.

2) The air supply apparatus 400 according to any embodiment disclosed herein, including the compressor 430, the fuel cell 410, the air lubrication device 420, the turbine 450, 550, and the flow control device 460, 560, 561. The turbine 450, 550, and the flow control device 460, 560, 561 are connected to the exhaust gas line 412, 512. The flow control device 460, 560, 561 is preferably a valve. The flow control device 460, 560, 561 is arranged downstream of the turbine 450, 550. The exhaust gas line 412, 512 may optionally be a bifurcated exhaust gas line having a first branch-off exhaust gas line and a second branch-off exhaust gas line. The turbine 450, 550 may be arranged upstream of the bifurcation. The flow control device 460, 560, 561, and the air lubrication device 420 may be arranged in series in the first branch-off exhaust gas line. The second branch-off exhaust gas line may include a further flow control device. The second branch-off exhaust gas line, and in particular the further flow control device, may be configured for directly releasing the pressurised fluid to the atmosphere.

3) The air supply apparatus 400 according to any embodiment disclosed herein, including the compressor 430, the fuel cell 410, the air lubrication device 420, the turbine 450, 550, and the flow control device 460, 560, 561. The turbine 450, 550, and the flow control device 460, 560, 561 are connected to the exhaust gas line 412, 512. The flow control device 460, 560, 561 is preferably a valve. The exhaust gas line 412, 512 may optionally be a bifurcated exhaust gas line having a first branch-off exhaust gas line and a second branch-off exhaust gas line. The flow control device 460, 560, 561, and the air lubrication device 420 may be arranged in series in the first branch-off exhaust gas line. The second branch-off exhaust gas line may include the turbine 450, 550 and a further flow control device. The further flow control device 460, 560, 561 is arranged downstream of the turbine 450, 550. The second branch-off exhaust gas line, and in particular the further flow control device, may be configured for directly releasing the pressurised fluid to the atmosphere.

According to embodiments, which can be combined with other embodiments described herein, the fuel cell 410 is connected to a fuel supply. The fuel supply is configured for providing the fuel cell 410 with fuel. In particular, the fuel can be at least one of hydrogen, methane, methanol, ammonia or any other suitable fuel. Accordingly, compared to conventional fuels used in marine transportation such as heavy oil, eco friendliness can be improved.

The air supply apparatus 400 may further include at least one component selected from an after burner, an oxidizer, a heat exchanger, and a recirculation device. Typically, the at least one component is connected to the exhaust gas line 412. Providing one or more of the further components as described herein may be beneficial for improving the performance of the air supply apparatus, particularly the global system. It is to be understood that each of the at least one component can be arranged in series or parallel. For instance, the flow control device 460, 560, 561 may be provided in series to the at least one component, particularly downstream of the at least one component 450. Alternatively, the flow control device 460, 560, 561 can be provided in parallel to the at least one component.

According to embodiments, which can be combined with other embodiments described herein, the fuel cell 410 is a proton exchange membrane fuel cell (PEMFC) or a solid oxide fuel cell (SOFC) or, a fuel cell hybrid system or any other fuel cell type, particularly any other fuel cell for mobile applications.

According to embodiments, which can be combined with other embodiments described herein, an air supply apparatus 400 may include a plurality of fuel cells and/or a plurality of air lubrication devices. Each of the plurality of fuel cells and/or the plurality of air lubrication devices may be connected to the pressurised line system and/or may be in fluid communication with the compressor. The compressor 430 may be configured for providing pressurised fluid to each of the plurality of fuel cells and/or the plurality of air lubrication devices.

According to another aspect of the present disclosure a ship 700 including an air supply apparatus 400 according to any embodiments described herein is provided. Thus, a ship with a more efficient end more ecofriendly system for water-hull friction reduction can be provided, which can reduce the overall operation costs. In the present disclosure, the term "ship" may also include a boat or any other watercraft.

In another aspect of the present disclosure, a method of installing a fuel cell in an air supply apparatus for a ship is provided. The air supply apparatus includes an air lubrication device for resistance reduction of the ship, and a compressor for providing the air lubrication device with pressurised fluid. The method may include providing the fuel cell and a pressurised line system having an intake gas line or a bifurcated intake gas line and an exhaust gas line. The method further includes connecting the compressor outlet and an inlet of the fuel cell via an intake gas line or a bifurcated intake gas line. The method includes connecting an inlet of the air lubrication device with an exhaust gas outlet of the fuel cell via an exhaust gas line or connecting an inlet of the air lubrication device with the compressor outlet via the bifurcated intake gas line.

The method may include the air supply apparatus, the fuel cell, and the pressurised line system according to any embodiment described herein. Furthermore, the method may include installing any of the components according to any embodiment described herein in any of the locations (i.e. the position within the pressurised line system and upstream/downstream of other components) described herein. For example, the method may further include installing a turbine, and/or a flow control device.

According to an aspect of the present disclosure an air supply apparatus 100 for a ship 200 is provided.

Embodiment 1: The air supply apparatus 100 comprising a fuel cell 110, and an air lubrication device 120 for resistance reduction of the ship 200, wherein an exhaust gas outlet 111 of the fuel cell 110 is connected with the air lubrication device 120 via an exhaust gas line 112 for supplying exhaust gas to the air lubrication device 120.

Embodiment 2: The air supply apparatus 100 of embodiment 1, wherein the fuel cell 110 is connected to a compressor 130 for providing the fuel cell 110 with pressurized air.

Embodiment 3: The air supply apparatus 100 of embodiment 1 or 2, wherein the fuel cell 110 is connected to a fuel supply 140 for providing the fuel cell 110 with fuel, particularly the fuel being at least one of hydrogen, methane, methanol, ammonia or any other suitable fuel.

Embodiment 4: The air supply apparatus 100 of any of embodiments 1 to 3, further comprising at least one component 150 selected from an after burner, an oxidizer, a turbine, an expander, a heat exchanger, a throttle, particularly a flap, and a recirculation device, wherein the at least one component 150 is connected to the exhaust gas line 112.

Embodiment 5: The air supply apparatus 100 of any of embodiments 1 to 4, further comprising a flow control device 160 connected to the exhaust gas line 112, particularly the flow control device 160 being a valve or a flap.

Embodiment 6: The air supply apparatus 100 of embodiments 4 and 5, wherein the flow control device 160 is provided in series to the at least one component 150, particularly downstream of the at least one component 150, or wherein the flow control device 160 is provided in parallel to the at least one component 150.

Embodiment 7: The air supply apparatus 100 of any of embodiments 1 to 6, wherein the fuel cell 110 is a proton exchange membrane fuel cell PEMFC or a solid oxide fuel cell SOFC or any other fuel cell for mobile applications.

Embodiment 8: The air supply apparatus 100 of any of embodiments 1 to 7, wherein the exhaust gas outlet 111 of the fuel cell 110 is directly connected with the air lubrication device 120 via the exhaust gas line 112, such that the exhaust gas from the fuel cell is directly routed to air lubrication device, particularly without using the exhaust gas rest energy to propel a turbocharger.

According to a further aspect of the present disclosure, a ship 200 comprising an air supply apparatus 100 according to any of embodiments 1 to 8 is provided.

According to another aspect of the present disclosure, a method 300 of supplying air to an air lubrication device 120 of a ship 200, is provided.

Embodiment 9: The method 300 comprising supplying 310 exhaust gas from a fuel cell 110 to the air lubrication device 120.

Embodiment 10: The method 300 of embodiment 9, further comprising providing 320 the fuel cell 110 with pressurized air.

Embodiment 11: The method 300 of embodiment 9 or 10, further comprising guiding 330 the exhaust gas through at least one component 150 selected from an after burner, an oxidizer, a turbine, an expander, a heat exchanger, a throttle, particularly a flap, and a recirculation device, prior to ejecting the exhaust gas from the air lubrication device 120.

Embodiment 12: The method 300 of any of embodiments 9 to 11, further comprising controlling 340 the exhaust gas flow provided to the air lubrication device 120 by using a flow control device 160, particularly a valve or a flap.

Embodiment 13: The method 300 of any of embodiments 9 to 12, wherein the exhaust gas is $O_2$-poor air and/or steam.

Embodiment 14: The method 300 of any of embodiments 9 to 13, wherein supplying 310 the exhaust gas from the fuel cell 110 to the air lubrication device 120 comprises directly routing the exhaust gas to the air lubrication device.

Embodiment 15: The method 300 of any of embodiments 9 to 14, wherein supplying 310 the exhaust gas from the fuel cell 110 to the air lubrication device 120 comprises routing the exhaust gas to the air lubrication device without using the exhaust gas rest energy to propel a turbocharger.

Embodiment 16. The method of any of embodiments 9 to 15, further comprising using 350 an air supply apparatus 100 according to any of embodiments 1 to 8.

Hence, in view of the above, it is to be understood that compared to the state of the art, the embodiments described herein beneficially provide for improved energy efficiency and eco friendliness, such that $CO_2$ emission and operation costs can be reduced.

While the foregoing is directed to embodiments, other and further embodiments may be devised without departing from the basic scope, and the scope is determined by the claims that follow.

REFERENCE NUMBERS

100 air supply apparatus
110 fuel cell
111 exhaust gas outlet
112 exhaust gas line
120 air lubrication device
140 fuel supply
150 component
160 flow control device
200 ship
300 method of supplying air to an air lubrication device
310, 320, 330, 340, 350 blocks representing method steps of the method of supplying air to an air lubrication device
400 air supply apparatus
410 fuel cell
411, 511 exhaust gas outlet
412, 512 exhaust gas line
414 intake gas line
415 fuel cell bypass
416 fuel cell bypass flow control device
420 air lubrication device
430 compressor
450, 550 turbine
451 turbine bypass
452 turbine bypass valve
460, 560, 561 flow control device
480 blow-off valve
514 bifurcated intake gas line
515 first branch-off intake line
516 second branch-off intake line
530 high-pressure compressor
570 inflow control device
700 ship

The invention claimed is:

1. An air supply apparatus for a ship, comprising:
a fuel cell;
an air lubrication device for resistance reduction of the ship;
a compressor connected to a pressurised line system for providing a pressurised fluid to the pressurised line system, wherein:
the pressurised line system is connected to the fuel cell for providing the fuel cell with pressurised fluid from the compressor, and wherein
the pressurised line system is further connected to the air lubrication device for providing pressurised fluid to the air lubrication device,
wherein a compressor outlet of the compressor is connected with the air lubrication device via a bifurcated intake gas line of the pressurised line system for supplying pressurised fluid from the compressor outlet to the air lubrication device, and
wherein the bifurcated intake gas line includes a first branch-off intake line connected to the fuel cell and a second branch-off intake line connected to the air lubrication device.

2. The air supply apparatus of claim 1, further comprising a fuel cell bypass connected to the pressurised line system.

3. The air supply apparatus of claim 1, wherein the fuel cell is connected to a fuel supply for providing the fuel cell with fuel, the fuel being at least one of hydrogen, methane, methanol, ammonia or any other suitable fuel.

4. The air supply apparatus of claim 1, wherein the fuel cell is a proton exchange membrane fuel cell (PEMFC) or a solid oxide fuel cell (SOFC), a fuel cell hybrid system or any other fuel cell for mobile applications.

5. The air supply apparatus of claim 1, further comprising a turbine connected to the exhaust gas line, wherein the turbine is provided in series to the flow control device upstream of the flow control device.

6. The air supply apparatus of claim 1, wherein an exhaust gas outlet of the fuel cell is connected with the air lubrication device via an exhaust gas line of the pressurised line system for supplying exhaust gas to the air lubrication device.

7. The air supply apparatus of claim 6, further comprising a fuel cell bypass connected to the bifurcated intake gas line or an intake gas line and the exhaust gas line.

8. The air supply apparatus of claim 1, further comprising at least one of a flow control device connected to the exhaust gas line or the second branch-off intake line and a blow-off valve for releasing pressurised fluid, wherein the blow-off valve is connected to the exhaust gas line.

9. The air supply apparatus of claim 8, wherein the blow-off valve is arranged downstream of the turbine or upstream of the turbine bypass merging or uniting with the exhaust gas line.

10. The air supply apparatus of claim 1, further comprising a turbine connected to the exhaust gas line, wherein the turbine is provided in series to the flow control device.

11. The air supply apparatus of claim 10, further comprising a turbine bypass and a turbine bypass valve connected to the exhaust gas line.

12. The air supply apparatus of claim 1, further comprising an inflow control device arranged downstream of the compressor and upstream of the fuel cell for controlling a charging pressure of the fuel cell.

13. The air supply apparatus of claim 12, wherein the inflow control device is at least one of a valve, a flap and a second turbine.

14. The air supply apparatus of claim 1, further comprising at least one of a high-pressure compressor arranged downstream of the compressor and upstream of the fuel cell for providing the fuel cell with pressurised fluid; and an intercooler arranged between the compressor and the high-pressure compressor.

15. The air supply apparatus of claim 14, wherein the high-pressure compressor is configured for supplying the pressurised fluid to the air lubrication device via the fuel cell.

16. A ship comprising an air supply apparatus, the air supply apparatus comprising:

a fuel cell;

an air lubrication device for resistance reduction of the ship;

a compressor connected to a pressurised line system for providing pressurised fluid to the pressurised line system, wherein the pressurised line system is connected to the fuel cell for providing the fuel cell with pressurised fluid from the compressor, and wherein the pressurised line system is further connected to the air lubrication device for providing pressurised fluid to the air lubrication device, wherein a compressor outlet of the compressor is connected with the air lubrication device via a bifurcated intake gas line of the pressurised line system for supplying pressurised fluid from the compressor outlet to the air lubrication device, and wherein the bifurcated intake gas line includes a first branch-off intake line connected to the fuel cell and a second branch-off intake line connected to the air lubrication device.

17. A method of installing a fuel cell in an air supply apparatus for a ship, the air supply apparatus comprising an air lubrication device for resistance reduction of the ship, and a compressor for providing the air lubrication device with pressurised fluid, the method comprising:

connecting an outlet of the compressor and an inlet of the fuel cell via a bifurcated intake gas line for providing the fuel cell with pressurised fluid from the compressor; and connecting an inlet of the air lubrication device with the compressor outlet via the bifurcated intake gas line.

\*   \*   \*   \*   \*